US005882509A

United States Patent [19]

Perman

[11] Patent Number: 5,882,509

[45] Date of Patent: Mar. 16, 1999

[54] CHIP-WASHING ARRANGEMENT

[75] Inventor: Per Perman, Sundsbruk, Sweden

[73] Assignee: Sunds Defibrator Industries AB, Sweden

[21] Appl. No.: 807,819

[22] Filed: Feb. 26, 1997

[30] Foreign Application Priority Data

Feb. 29, 1996 [SE] Sweden .................................. 9600795

[51] Int. Cl.[6] ........................... B01D 21/26; B01D 21/02; B01D 21/34

[52] U.S. Cl. ..................... 210/97; 210/195.1; 210/195.3; 210/257.1; 210/258; 210/254; 210/294; 210/304; 210/512.1; 137/56 R; 137/109

[58] Field of Search .............................. 210/195.1, 195.3, 210/304, 252, 258, 125.9, 512.1, 299, 197, 532.1, 112.7, 257.1; 134/56 R, 109

[56] References Cited

U.S. PATENT DOCUMENTS

| | | |
|---|---|---|
| 3,279,597 | 10/1966 | Reinhall . |
| 4,714,558 | 12/1987 | Barbee et al. .......................... 210/259 |
| 4,865,751 | 9/1989 | Smisson ............................... 210/532.1 |
| 5,062,963 | 11/1991 | Marcinkowski et al. ............ 210/512.1 |
| 5,421,883 | 6/1995 | Bowden ................................ 134/56 R |

FOREIGN PATENT DOCUMENTS

| | | |
|---|---|---|
| 1255082 | 2/1963 | Germany . |
| 2220132 | 4/1972 | Germany . |

*Primary Examiner*—David A. Reifsnyder
*Attorney, Agent, or Firm*—Lerner, David, Littenberg, Krumholz & Mentlik

[57] ABSTRACT

Apparatus for treating wash water is disclosed. The apparatus includes a settling tank in which sludge is separated from the wash water, a circulation tank for temporary storage of the clean wash water from the settling tank, and from which the clean wash water can be recycled for washing further chips, and a hydrocyclone for separating water from the sludge for recycle to the settling tank. Methods for treating wash water utilizing such apparatus are also disclosed.

11 Claims, 2 Drawing Sheets

1
2
3
4
5
6
7
8
9
10
11
12
13
14
17
18
19
20
21
22
23
24
25
29
30
31

CHIP-WASHING ARRANGEMENT

FIELD OF THE INVENTION

The present invention relates to an apparatus and methods for treating a circulating flow of water in a chip washer. More particularly, the present invention relates to such apparatus and methods in which wash water that has been separated from the chips is cleaned and returned to the chip wash.

BACKGROUND OF THE INVENTION

A chip washer of the type used with recirculation of wash water generally forms part of a fiberboard production line, in which the wood chips are normally delivered to the chip classifier. The washed chips are then delivered to a chip bin on a chip-refining apparatus in which the chips are refined. Such a chip washer will comprise a scrap separator, a chip pump, a screw dewaterer and a water-treating arrangement. The water flow circulates from this latter arrangement, from the screw dewaterer and back to the scrap separator while cleaning the water in the process.

Known systems of this kind use a single tank for both cleaning and buffering the water. One drawback with these known systems is that it is necessary to interrupt the process at given intervals in order to clean the tank and remove settled bottom sludge therefrom. Another drawback is that the water is not cleaned satisfactorily with this type of tank. Furthermore, because of its small volume the buffering capacity, or temporary storage capacity, of the tank is poor.

One object of the present invention is to provide an arrangement for treating a circulating flow of water in a chip washer with which it is unnecessary to stop the process intermittently, but which will enable the process to be effected continuously and with which cleansing and buffering of the water are also improved.

SUMMARY OF THE INVENTION

In accordance with the present invention, this and other objects have now been accomplished by the invention of apparatus for treating wash water containing sludge separated from washed chips for recycling to wash further chips which comprises a settling tank including a settling tank inlet, a clean water outlet and a sludge outlet whereby the wash water can be fed to the settling tank inlet and separated into sludge and clean wash water therein, a circulation tank including a circulation tank inlet for receiving the clean wash water from the clean water outlet, and a recycle water outlet whereby the clean wash water from the settling tank can be temporarily stored in the circulation tank before being recycled for washing further chips through the recycle water outlet, and a hydrocyclone for separating water from the sludge including a hydrocyclone inlet for receiving the sludge from the sludge outlet of the settling tank and a hydrocyclone outlet for delivering the separated water to the clean water inlet of the settling tank.

In accordance with one embodiment of the apparatus of the present invention, the settling tank inlet is substantially tangentially disposed so as to create a vortex flow within the settling tank. Preferably, the settling tank includes an upper portion and a lower portion, and the clean water outlet includes an entrance port and is positioned substantially centrally within the settling tank, the entrance port being disposed in the upper portion of the settling tank. In a preferred embodiment, the sludge outlet is disposed in a lower portion of the settling tank. Most preferably, the lower portion of the settling tank is substantially conical in configuration, and the sludge outlet is located substantially at the lower apex of the conical configuration. Most preferably, the settling tank is substantially circular in configuration.

In accordance with another embodiment of the apparatus of the present invention, the settling tank is substantially circular in configuration, and the upper portion of the settling tank includes a cylindrical wall forming an annular chamber around the periphery of the settling tank.

In accordance with another embodiment of the apparatus of the present invention, the circulation tank includes a fresh water inlet for supplying fresh water to the circulation tank. Preferably, the circulation tank includes a wash water outlet whereby a portion of the wash water in the circulation tank can be separately recycled for use in washing the chips. In a preferred embodiment, the apparatus includes a wash water pump associated with the wash water outlet of the circulation tank. Preferably, the circulation tank includes a level monitor for monitoring the level of the wash water in the circulation tank whereby the supply of fresh water to the circulation tank can be controlled thereby.

In accordance with the method of the present invention, a method has been discovered for treating wash water containing sludge separated from washed chips for recycling the wash water to wash further chips which method comprises cleaning the wash water in a settling tank by separating the sludge from the wash water, supplying the wash water separated from the sludge to a circulation tank, temporarily storing the wash water in the circulation tank, recycling the wash water in the circulation tank for washing further chips, separating additional water from the sludge separated from the wash water, and delivering the separated additional water to the settling tank.

In accordance with one embodiment of the method of the present invention, separating of the additional water from the sludge is carried out in a hydrocyclone.

In accordance with another embodiment of the method of the present invention, the cleaning of the wash water in the settling tank comprises substantially tangentially injecting the wash water into the settling tank so as to create a vortex flow therein. In a preferred embodiment, supplying of the wash water separated from the sludge to the circulation tank comprises withdrawing the wash water from the central portion of the settling tank. In a most preferred embodiment, the separating of the sludge from the wash water comprises removing the sludge from the lower portion of the settling tank.

In accordance with another embodiment of the method of the present invention, the method includes supplying fresh water to the circulation tank and separately recycling a portion of the wash water in the circulation tank for use in washing the chips. In a preferred embodiment, the method includes monitoring the level of the wash water in the circulation tank and controlling the supply of the fresh water to the circulation tank based thereon.

BRIEF DESCRIPTION OF THE DRAWINGS

The present invention may be more fully appreciated with reference to the following detailed description, which, in turn, refers to the drawings in which.

DETAILED DESCRIPTION

Figure 1:
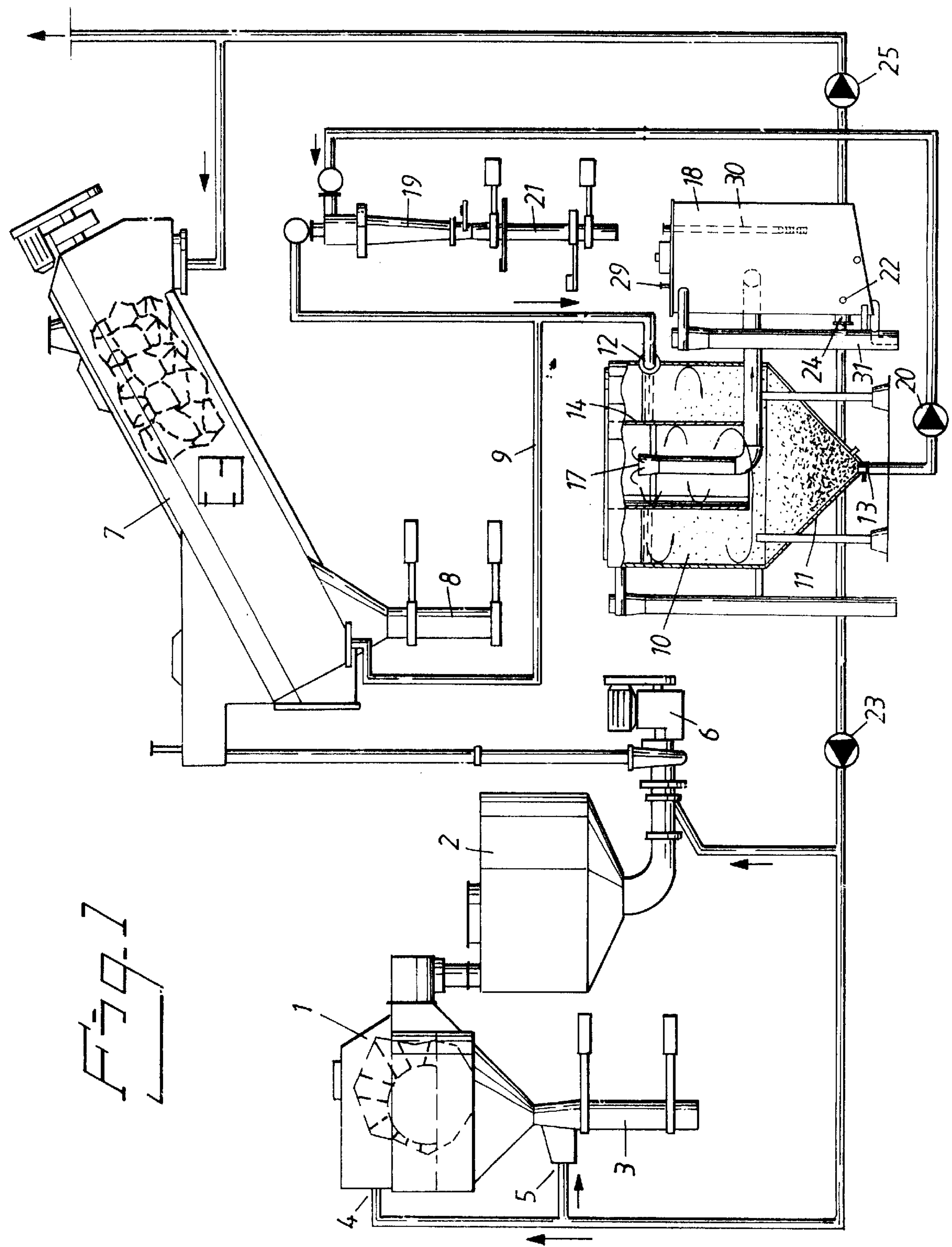
FIG. 1 is an elevational, schematic representation of a chip washing system in accordance with the present invention.
Figure 2:
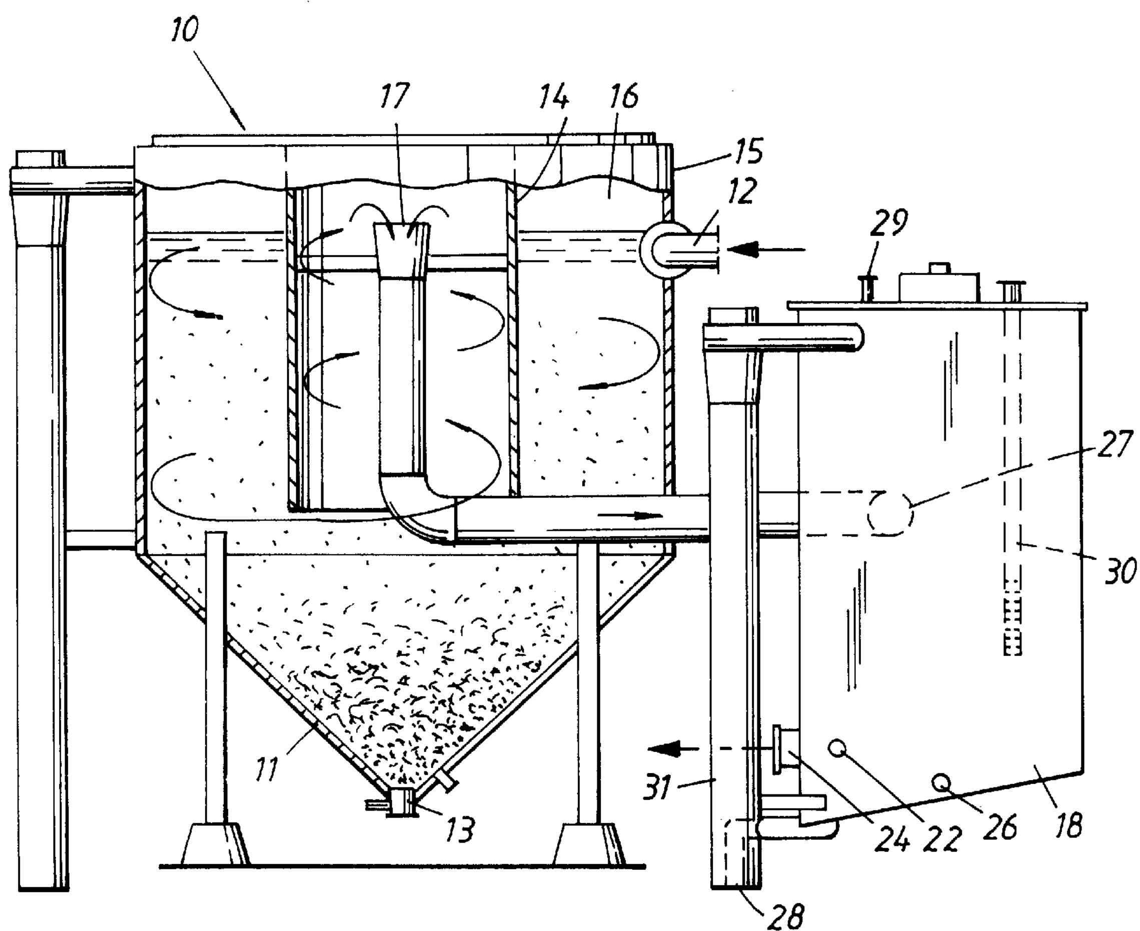
FIG. 2 is a side, elevational, schematic view of a settling tank and circulation tank used in accordance with the present invention.

Referring to the Figures, in which like reference numerals refer to like elements thereof, the first chip washing stage takes place in a scrap separator 1, in which the chips are forced beneath the surface of the water by vanes carried on a rotating drum. The scrap separator 1 is continuously supplied with water, which transports the chips to a chip pump tank 2. Heavy contaminants, such as stones, large sand particles and other foreign and heavy materials are separated in the scrap separator and fall rapidly through the container down into a sand trap. The sand trap is emptied regularly through an outfeed sluice 3. Water enters the scrap separator both at the top 4 and at the bottom 5 thereof. The water delivered at 5 is regulated manually to generate an upward flow in the separator. The rate at which the water flows is chosen so that heavy particles above a given size will sink and the chips will be forced upwards, so as to avoid excessively heavy chips being evacuated through the outfeed sluice 3.

The chips are transported from the chip pump tank 2 to a screw dewaterer 7 by means of a chip pump 6. In the screw dewaterer 7, the chips are transported by one or two feeder screws over a perforated screening plate where water is separated from the chips. The dewatered chips are deposited directly in a chip bin from which the chips are fed into a chip refiner. The screw dewaterer 7 includes a contaminant outfeed sluice 8.

The water separated from the chips is returned to the scrap separator 1 by means of a water treatment arrangement in which water is cleansed from a portion of its contaminant content. This arrangement includes a conduit 9 which leads to a settling tank 10. This settling tank is designed to utilize the speed of the recycled water from the screw dewaterer to cause heavy particles in the wash water to settle. The conical bottom 11 of the tank 10 enables sludge to be removed continuously from the tank without stopping the system. The water enters the tank 10 tangentially through the inlet 12, in the manner of a hydrocyclone. This creates a vortex in the tank which forces the heavy particles to move towards the tank wall, from where the particles fall down onto the tank bottom and discharge through the bottom outlet 13. A circular cylindrical wall 14 arranged centrically in the tank 10 defines, together with the circular water wall 15 of the tank, an annular chamber 16 in which the water is forced to flow around and helically downwards before flowing helically upwards inwardly of the wall 14. The cleansed water is evacuated through a centrally positioned spillway or overflow 17. The manner in which water is delivered through the inlet 12 also reduces foaming tendencies.

Because the settling tank 10 can be emptied solely by means of the spillway, the tank cannot be used as a buffer. Accordingly, a circulation tank 18 is provided in the flow path downstream of the settling tank 10, as described in more detail below.

The sludge settling in the settling tank 10 is evacuated continuously from the bottom outlet 13 of the tank, and the sludge-contaminated water leaving the outlet is cleansed in a hydrocyclone 19 and then returned to the settling tank 10. A pump 20 is provided to this end. The pump functions to pump water from the bottom of the settling tank 10 to the top of the hydrocyclone 19, to which the water is delivered tangentially under pressure. The contaminants are separated from the water by the centrifugal force generated therein. The cleansed water is sucked up in the center of the hydrocyclone and recycled to the inlet 12 of the settling tank, whereas sand and other heavy contaminants are collected in the bottom of the cyclone reject chamber, which is emptied with the aid of an automatically controlled outfeed sluice 21.

The circulation tank 18 receives the cleansed water from the settling tank 10 through an inlet 27. The circulation tank 18 functions as a water buffer or temporary storage means in the chip-washing system and contains the buffer volume needed to start and stop the chip wash. A level monitor 22 mounted in a pipe connection controls the level of water in the circulation tank between minimum and maximum levels, by controlling the delivery of fresh water through an inlet 29. Excess water is removed through an overflow pipe 31. It is important that the volume of fresh water delivered to the tank is sufficient to ensure a minimum water level therein. It is also important to realize that the wash water system is not a static system. Changes in the water flow are generated under different operating conditions. Such changes occur when starting and stopping the process and when the chip wash is run with chips or solely with water. The surface area of the circulation tank 18 is an important parameter in this respect. A large surface area is less sensitive to fluctuations in the water flow and the water level will therefore be more stable and easier to adjust. A stable water level creates more stable conditions for those pumps connected to the tank and will also assist in avoiding problems in starting the chip wash system.

A circulation pump 23 recycles the cleansed water from the circulation tank outlet 24 back to the water inlets 4 and 5 of the scrap separator 1 and to the chip pump 6. A wash-water pump 25 pumps water from an outlet 26 on the circulation tank back to the screw dewaterer 7 and to the chip inferred screw (not shown) of the chip refiner, so as to wash clean these parts of the system and therewith avoid the build-up of wood chippings and other contaminants, for instance. This water is then recycled to the settling tank 10. The contaminants that settle on the bottom of the circulation tank 18 are removed therefrom through an outlet 28. Low pressure steam can be delivered through an inlet pipe 30 when needing to heat the circulating water.

The inventive arrangement enables the process to be carried out continuously, without the need to interrupt the process for the removal of settled bottom sludge. The hydrocyclone 19 also enables the tank to be cleaned after stopping the chip wash, by running the hydrocyclone pump 25 for an appropriate length of time after stopping the chip wash. This prevents the sludge from forming a bottom plug during this stationary period. The inventive arrangement also provides a marked improvement in cleansing the water, as a result of the high cleaning effect afforded by the settling tank. The division of the settling and buffering functions into two tanks also provides a sufficiently large buffer volume to obtain a smoother function.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. Apparatus for treating and recycling wash water from a cleaning system, comprising:

a) a settling tank including a settling tank inlet, a clean water outlet and a sludge outlet for separating wash water into clean wash water and sludge;

b) a circulation tank for temporarily storing said clean wash water, said circulation tank including a circulation tank inlet for receiving said clean wash water from said clean water outlet and a recycle water outlet for recycling said clean wash water to said cleaning system; and c) a hydrocyclone for separating water from said sludge including a hydrocyclone inlet for receiving said sludge from said sludge outlet of said settling tank and a hydrocyclone outlet for delivering said separated water to said settling tank inlet.

2. The apparatus of claim 1 wherein said settling tank inlet is substantially tangentially disposed so as to create a vortex flow within said settling tank.

3. The apparatus of claim 2 wherein said settling tank includes an upper portion and a lower portion, and wherein said clean water outlet includes an entrance port and is positioned substantially centrally within said settling tank, said entrance port being disposed in said upper portion of said settling tank.

4. The apparatus of claim 3 wherein said sludge outlet is disposed in said lower portion of said settling tank.

5. The apparatus of claim 4 wherein said lower portion of said settling tank is substantially conical in configuration, and wherein said sludge outlet is located substantially at the lower apex of said conical configuration.

6. The apparatus of claim 5 wherein said settling tank has a cross-section which is substantially circular in configuration.

7. The apparatus of claim 4 wherein said settling tank has a cross-section which is substantially circular in configuration, and wherein said upper portion of said settling tank includes a cylindrical wall forming an annular chamber around the periphery of said settling tank.

8. The apparatus of claim 1 wherein said circulation tank includes a fresh water inlet for supplying fresh water to said circulation tank.

9. The apparatus of claim 8 wherein said circulation tank includes a wash water outlet for recycling said clean wash water, whereby said recycle water outlet and said wash water outlet recycle water to separate portions of said cleaning system.

10. The apparatus of claim 9 including a wash water pump operatively associated with said wash water outlet of said circulation tank for delivering said clean wash water to said cleaning system.

11. The apparatus of claim 8 wherein said circulation tank includes a level monitor for monitoring the level of said wash water in said circulation tank and for controlling said supply of fresh water to said circulation tank.

* * * * *